US010563290B2

(12) United States Patent
Ijichi et al.

(10) Patent No.: US 10,563,290 B2
(45) Date of Patent: Feb. 18, 2020

(54) AL ALLOY CONTAINING CU AND C AND ITS MANUFACTURING METHOD

(71) Applicants: SHIROGANE CO., LTD., Tochigi-ken (JP); Kenichi Ohshima, Ibaraki-ken (JP); METAL AND TECHNOLOGY INC., Tochigi-ken (JP)

(72) Inventors: Yoshihito Ijichi, Tochigi-ken (JP); Kenichi Ohshima, Ibaraki-ken (JP)

(73) Assignees: SHIROGANE CO., LTD., Tochigi-ken (JP); Kenichi Oshima, Ibaraki-ken (JP); METAL AND TECHNOLOGY INC., Tochigi-ken (JP)

( * ) Notice: Subject to any disclaimer, the term of this patent is extended or adjusted under 35 U.S.C. 154(b) by 329 days.

(21) Appl. No.: 15/509,533

(22) PCT Filed: Sep. 9, 2015

(86) PCT No.: PCT/JP2015/075611
§ 371 (c)(1),
(2) Date: Mar. 8, 2017

(87) PCT Pub. No.: WO2016/039380
PCT Pub. Date: Mar. 17, 2016

(65) Prior Publication Data
US 2017/0253949 A1    Sep. 7, 2017

(30) Foreign Application Priority Data

Sep. 9, 2014 (JP) ................. 2014-183634

(51) Int. Cl.
*C22C 1/02* (2006.01)
*C22C 21/12* (2006.01)
(Continued)

(52) U.S. Cl.
CPC .............. *C22C 1/026* (2013.01); *C01B 32/20* (2017.08); *C22C 1/02* (2013.01); *C22C 1/03* (2013.01);
(Continued)

(58) Field of Classification Search
None
See application file for complete search history.

(56) References Cited

U.S. PATENT DOCUMENTS

| 2008/0085403 | A1  | 4/2008 | Sayir |
| 2012/0093682 | A1  | 4/2012 | Bryant |
| 2012/0216980 | A1* | 8/2012 | Cintron-Aponte ..... B22D 13/04 164/97 |

FOREIGN PATENT DOCUMENTS

| CN | 103014463 | 4/2013 |
| JP | 44-1042   | 1/1944 |

(Continued)

OTHER PUBLICATIONS

JP 2003-138328 A English Translation (Year: 2003).*

(Continued)

*Primary Examiner* — Anita Nassiri-Motlagh
(74) *Attorney, Agent, or Firm* — Wenderoth, Lind & Ponack, L.L.P.

(57) ABSTRACT

Provided is a method for manufacturing an Al alloy that includes Cu and C, by a manufacturing method provided with a step for adding graphite particles, and particles of a carbonization promoter containing boron or a boron compound, to Al molten metal that includes Cu.

8 Claims, 5 Drawing Sheets

(51) Int. Cl.
    *C22C 21/14*     (2006.01)
    *C22C 1/03*     (2006.01)
    *C22C 21/16*     (2006.01)
    *C01B 32/20*     (2017.01)
    *C22C 32/00*     (2006.01)
    *C23C 8/44*     (2006.01)

(52) U.S. Cl.
    CPC .............. *C22C 21/12* (2013.01); *C22C 21/14* (2013.01); *C22C 21/16* (2013.01); *C22C 32/0047* (2013.01); *C22C 32/0052* (2013.01); *C23C 8/44* (2013.01)

(56) References Cited

FOREIGN PATENT DOCUMENTS

| | | |
|---|---|---|
| JP | 56-116851 | 9/1981 |
| JP | 6-212320 | 8/1994 |
| JP | 2003-138328 | 5/2003 |
| JP | 5397966 | 1/2014 |

OTHER PUBLICATIONS

Supplementary European Search Report dated Feb. 22, 2018 in corresponding European patent application No. 15 83 9864.4.
International Preliminary Report on Patentability dated Mar. 14, 2017 in International Application No. PCT/JP2015/075611.
International Search Report dated Dec. 15, 2015 in International Application No. PCT/JP2015/075611.

\* cited by examiner (a)

(b)

(c)

AL ALLOY CONTAINING CU AND C AND ITS MANUFACTURING METHOD

TECHNICAL FIELD

This invention relates to an Al alloy containing Cu and C and its manufacturing method.

BACKGROUND ART

Typical ones of high-strength aluminum alloys include Al—Cu-based, so-called 2000 series aluminum (Al) alloys referred to as duralumin, super duralumin, etc. The main component of the 2000 aluminum alloys is copper (Cu), and the alloys are reinforced mainly by participation of $CuAl_2$ ($\theta$ phase) or a similar phase.

Although strength can be further improved by adding elements, such as Mg, to the Al—Cu alloy, improvement of the strength attained by the addition of such metal elements is limited. In addition, since Al—Cu alloys inherently do not have excellent corrosion resistance, alloy design that further adds alloy element should avoid lowering of corrosion resistance. With Al—Cu binary alloys, uniform structure is unlikely to be obtained, and the freedom in setting the content of Cu is relatively low.

Patent Document 1 (the inventors of this patent and the inventors of the present application overlap) describes that adding carbon (C) in the form of graphite to copper results in higher tensile strength of the resultant Cu—C alloy. In addition, the document also describes a method of preparing such a Cu—C alloy. The present inventors have estimated that if C can be added to an Al—Cu alloy as with the case of Cu, the Al—Cu alloy can be made high in strength.

PRIOR ART DOCUMENT

Patent Document

Patent Document 1: Japanese Patent JP5397966B2

SUMMARY OF THE INVENTION

The object of the present invention is to provide a technique of adding C to an Al alloy containing Cu that can enhance the strength of the Al alloy.

According to one embodiment of the invention, there is provided a method for preparing an Al alloy containing Cu and C. This method includes adding a graphite powder and a carburization promoter to a molten Al containing Cu.

The carburization promoter may be one including boron (B), or a boron compound such as borax.

Preferably, the temperature of the molten metal at the time when a graphite powder and a carburization promoter are added is 800° C. to 1000° C. If less than 800° C., it takes a long time to dissolve the graphite powder into the molten metal, or the graphite powder is not dissolved sufficiently. If over 1000° C., the oxidation of aluminum becomes violent, and electricity costs for a melting furnace rise drastically, thus being not economical.

When the graphite powder and the carburization promoter are added, the oxygen concentration around the molten metal is preferably suppressed low. The low oxygen concentration atmosphere can be achieved by using, for example, a closed reverberatory furnace (see embodiments described later). If the oxygen concentration is suppressed low, the loss caused by oxidation and combustion of the graphite powder can be suppressed. Alternatively, the melting furnace may be accommodated in vacuum chamber, or the surface of the molten metal may be covered with a shield gas comprising an inert gas such as an argon gas.

Preferably, the composition of the molten metal at the time when the graphite powder and the carburization promoter are added is an eutectic composition of an Al—Cu alloy (i.e., Al-33 wt % Cu), or a composition similar to the eutectic composition (Cu content is slightly shifted to the hypoeutectic side or to the hypereutectic side). For instance, the composition of the molten metal can be set within a range of Al-27-36 wt % Cu. It is well known that when a third element (metal element) is added to a binary alloy, the third element can be efficiently added by adding the third element to the binary alloy having an eutectic composition or a composition similar thereto. It has been confirmed through the studies of the present inventors that the above is also true in a case where graphite is added to an Al—Cu binary alloy.

At least pure Al (e.g., pure Al ingot) may be dissolved in the molten metal, to which the graphite powder and the carburization promoter has been added so as to dilute the molten metal, in order to adjust the Cu concentration and the C concentration to desired values. Al and alloy components, which are contained in Al—Cu alloys called duralumin or super duralumin, such as magnesium (Mg), manganese (Mn), may be added to the molten metal after addition of the graphite powder and the carburization promoter, so as to prepare an alloy having a composition corresponding to duralumin or super duralumin and containing C. These alloy components can be added in the form of a master alloy.

Alternatively, the graphite particles and the particles of the carburization promoter may be added to an aluminum alloy having a desired composition and containing Cu as a main additive element, e.g., a molten metal having a composition corresponding to the above-indicated duralumin or super duralumin, thereby to prepare a carbon-added aluminum alloy. This procedure also enables carbon to be uniformly added to the alloy.

The Al alloy containing Cu and C prepared in this way may be an Al—Cu—C ternary alloy containing Cu and C with the balance of Al and inevitable impurities, or an alloy containing at least one alloy element other than Cu and C. The alloy may contain silicon (Si) aside from Al, Cu and C. More particularly, the alloy may be, for example, AC2A (Al—Si—Cu alloy) defined by "Aluminum Alloy Cast in JIS H5205" to which C is added.

According to another embodiment of the invention, there is provided an Al alloy containing Cu and C wherein C is distributed in the metal structure. This Al alloy can be prepared according to the above-described method. The Al alloy may further include an alloy element other than C.

EMBODIMENTS FOR CARRYING OUT THE INVENTION

Concrete embodiments of the present invention are now described.

<Preparation of Molten Al—Cu>

A molten metal having an eutectic composition (Al-33 wt % Cu) or a composition similar thereto, e.g. Al-28 wt % Cu having a hypoeutectic composition is provided. The molten metal having such a composition can be readily prepared by dissolving a commercially available Al—Cu master alloy. As a matter of course, an alloy having such a composition may be prepared on one's own initiative. The temperature of the molten metal is set at 800° C. to 1000° C.

Figure 1:
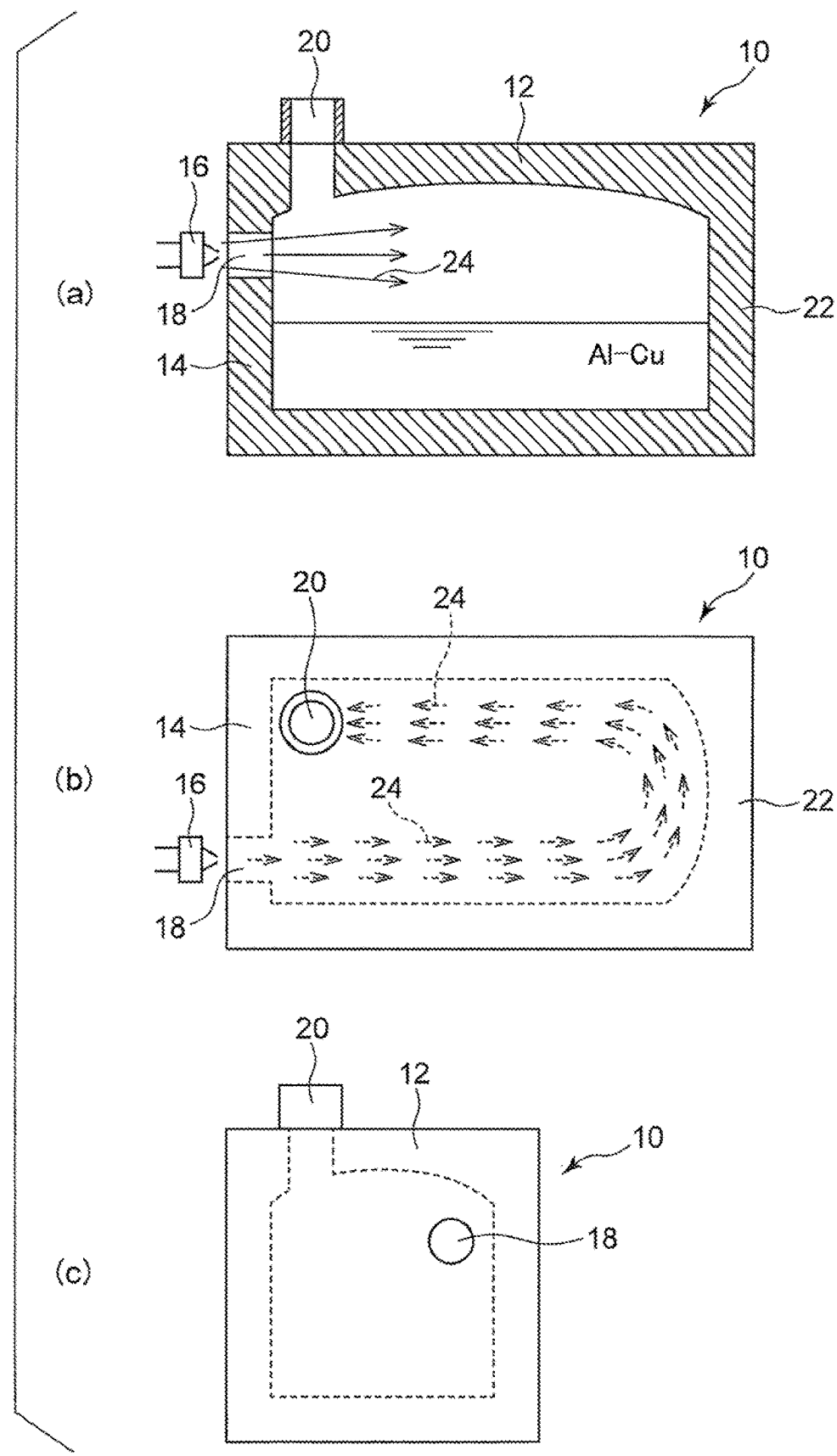
FIG. 1 is a diagram illustrating a furnace used for molten metaling an alloy wherein (a) is a schematic longitudinal sectional view, (b) is a schematic plan view, and (c) is a schematic front elevational view.

Here, there can be used a reverberatory furnace 10 which is schematically shown, for example, in FIG. 1. This reverberatory furnace 10 has a dome-shaped ceiling wall 12. A burner port 18, at which a heavy oil burner 16 is disposed, is provided at one side wall 14 of the reverberatory furnace 10. An exhaust port 20 is provided on the side of the side wall 14 of the ceiling wall 12 of the reverberatory furnace 10. The burner flame (i.e. a gas generated by combustion) injected from the burner port 16 against a side wall 22 on other side of the reverberatory furnace 10 is turned by the side wall 22 to permit it to be flown toward the side wall 12 and exhausted from the exhaust port 20 (see FIG. 1(b)). The air in the furnace is purged by the flow of the circulating combustion gas, and the oxygen in air existing in the furnace is consumed through combustion of an unburnt component contained in the combustion gas. This entails that the oxygen concentration in the reverberatory furnace can be suppressed low.

<Carburizing Treatment>

After the temperature of the Al—Cu master alloy melted in the reverberatory furnace 10 has become within a range of 800° C. to 1000° C. and the oxygen concentration in the reverberatory furnace 10 has been stabilized at a low level, graphite particles (which may be either powder or granules) and carburization promoter particles containing boron or a boron compound are charged into reverberatory furnace 10 from a material charge port, not shown. The graphite particles are attached to the carburization promoter particles and dispersed in the molten metal according to the natural convection of the molten metal. The natural convection of the molten metal enables good homogeneity of the molten metal to be ensured. The molten metal may be agitated by means of a known agitation means such as a non-contact electromagnetic stirrer to facilitate more uniform dispersion of the graphite particles and the carburization promoter particles in the molten metal.

After dissolving the graphite (carbon) in the aluminum molten metal, the carburization promoter completing its role becomes drossy and floats on the molten metal surface. The dross can be removed, for example, with a refractory ladle or the like.

It should be noted that when graphite particles alone are added without addition of a carburization promoter, the graphite particles continue to float on the surface of the molten metal and are not dispersed in the molten metal.

<Casting>

Subsequently, the molten metal is cast in an appropriate mold from a tap hole, not shown, provided at the lower portion of the reverberatory furnace 10, and solidified. In this way, the casting of the Al—Cu—C ternary alloy is completed. Thereafter, the resulting Al—Cu—C ternary alloy ingot is subjected to rolling, thermal treatment and the like, as needed basis.

Using the master alloy of the Al—Cu—C ternary alloy (wherein the Cu content is, for example, approximately 33 wt %) obtained according to the above manufacturing method, there can be prepared an alloy, which has a composition corresponding to duralumin (e.g. A2014 or A2017 defined by JIS H4140) or super duralumin (e.g. A2024 defined by JIS H4140) and contains C. In this case, the preparation is enabled by melting the Al—Cu—C master alloy, a master alloy containing a necessary alloy component, such as an Al—Mg master alloy, an Al—Mn alloy, and pure aluminum at appropriate ratios and casting the resulting molten metal in a mold.

Alternatively, prior to the casting but after the carburizing treatment, pure aluminum may be added to the molten metal so as to adjust the concentrations of Cu and C in the molten metal, followed by casting in a mold.

Still alternatively, prior to the casting but after the carburizing treatment, pure aluminum may be added to the molten metal, to which a master alloy containing a necessary alloy component, such as an Al—Mg alloy, an Al—Mn alloy, is further added, followed by casting in a mold. In doing so, there can be prepared an alloy having a composition corresponding to duralumin or super duralumin and containing C.

In the above embodiment, although the graphite particles and the carburization promoter particles are added to a molten metal of an Al—Cu binary alloy, particularly, to a molten metal having an eutectic composition or a composition close to the eutectic composition, but is not limited thereto. For instance, a carbon-added aluminum alloy may be prepared by adding the graphite particles and the carburization promoter particles to an aluminum alloy having a desired composition and containing Cu as a main additive element, e.g. a molten metal having a composition corresponding to such duralumin or super duralumin as mentioned above. This permits carbon to be uniformly added to the alloy.

EXAMPLES

Specific examples are now described below.

Samples having the compositions indicated in Table 1 appearing hereinafter were prepared. In Table 1, the contents of Cu and C are indicated. For the preparation of the samples of the alloys in examples (Examples 1 to 5), graphite particles and carburization promoter particles were added to a molten metal having a composition of Al-28 wt % Cu to provide a composition of Al-28 wt % Cu-X wt % C (wherein X was a value sufficient to provide the compositions of the alloys in the respective examples after dilution), followed by dilution of the molten metal with Al to provide compositions indicated in Table 1 and casting in a mold thereby obtaining ingots. (For the preparation of alloys in Comparative Examples (Comparative Examples 1, 2), a molten metal having a composition of Al-28 wt % Cu was diluted with Al to provide compositions indicated above followed by casting in a mold to prepare ingots.)

Next, with respect to the samples described as "rolling+ thermal treatment" at the column of "Treatment" in Table 1, an ingot was cut into a 160 mm long×30 mm wide×6 mm thick rectangular parallelepiped, followed by rolling to a thickness of 5 mm by means of a rolling machine. Next, the rolled sheet was cut into a flat tensile test piece in compliance with No. 13B defined by JIS Z2201. The size of the test piece was set at 60 mm in length of a parallel (reduced) section, 12.5 mm in width of the parallel (reduced) section, 25 mm in radius at a shoulder section, 3 mm in thickness and 20 mm in width at a grip section. Thereafter, the test piece was held in vacuum at 410° C. for 2 hours, cooled down to 260° C. at a temperature drop rate of 30° C. per hour, and allowed to be naturally cooled, followed by subjecting to a tensile test.

As to the samples not described as "rolling, thermal treatment" at the column of "Treatment" in Table 1, an ingot was directly cut (without rolling) into such a test piece as mentioned above. Additionally, such a series of thermal treatments as set out above were not performed.

The test pieces prepared in the manner as set out above were subjected to a tensile test using universal testing machine AG50KNI, manufactured by Shimadzu Corporation. In the tensile test, a maximum stress and a maximum displacement were confirmed. The "maximum stress" is a value obtained by dividing a maximum load (unit N) by a nominal sectional area (12.5×3 mm2). The "maximum displacement" is a crosshead displacement (mm) at the time when the maximum load appears. The test was carried out using 2 to 3 test pieces in the respective examples and comparative examples. The results are shown in Table 1.

TABLE 1

|  | Cu (wt %) | C (wt %) | Treatment | Maximum stress (N/mm$^2$) | Maximum displacement (mm) |
|---|---|---|---|---|---|
| Example 1 | 4 | 0.04 | — | 137 | 7.09 |
|  |  |  |  | 141 | 6.86 |
|  |  |  |  | 123 | 5.24 |
| Example 2 | 4 | 0.1 | — | 111 | 5.42 |
|  |  |  |  | 119 | 8.02 |
|  |  |  |  | 106 | 4.13 |
| Example 3 | 5 | 0.018 | — | 73.6 | 1.43 |
|  |  |  |  | 75.5 | 1.77 |
|  |  |  |  | 75.0 | 1.69 |
| Example 4 | 5 | 0.02 | rolling + thermal treatment | 131 | 7.28 |
|  |  |  |  | 137 | 8.37 |
|  |  |  |  | 137 | 8.81 |
| Example 5 | 5 | 0.05 | rolling + thermal treatment | 142 | 10.3 |
|  |  |  |  | 139 | 8.85 |
| Comparative Example 1 | 4 | — | — | 63.2 | 1.82 |
|  |  |  |  | 73.2 | 2.17 |
|  |  |  |  | 53.6 | 0.97 |
| Comparative Example 2 | 5 | — | rolling + thermal treatment | 43.1 | 1.56 |
|  |  |  |  | 74.9 | 2.78 |
| Comparative Example 3 | — | — | — | 57.2 | 17.7 |
|  |  |  |  | 58.1 | 18.4 |
|  |  |  |  | 57.5 | 13.9 |

In view of the above test results, it will be clear particularly by comparing Examples 4, 5 with Comparative Example 2 or comparing Example 2 with Comparative Example 1 that remarkably improved strength can be realized by the addition of C to the Al—Cu alloy. Additionally, a tendency to reduce a strength variation by the addition of C is recognized. It is assumed that although the Al—Cu binary alloy involves some difficulty in obtaining a structure with high uniformity, the addition of C is able not only to improve strength, but also to attain the improved uniformity of the structure.

Figure 2:
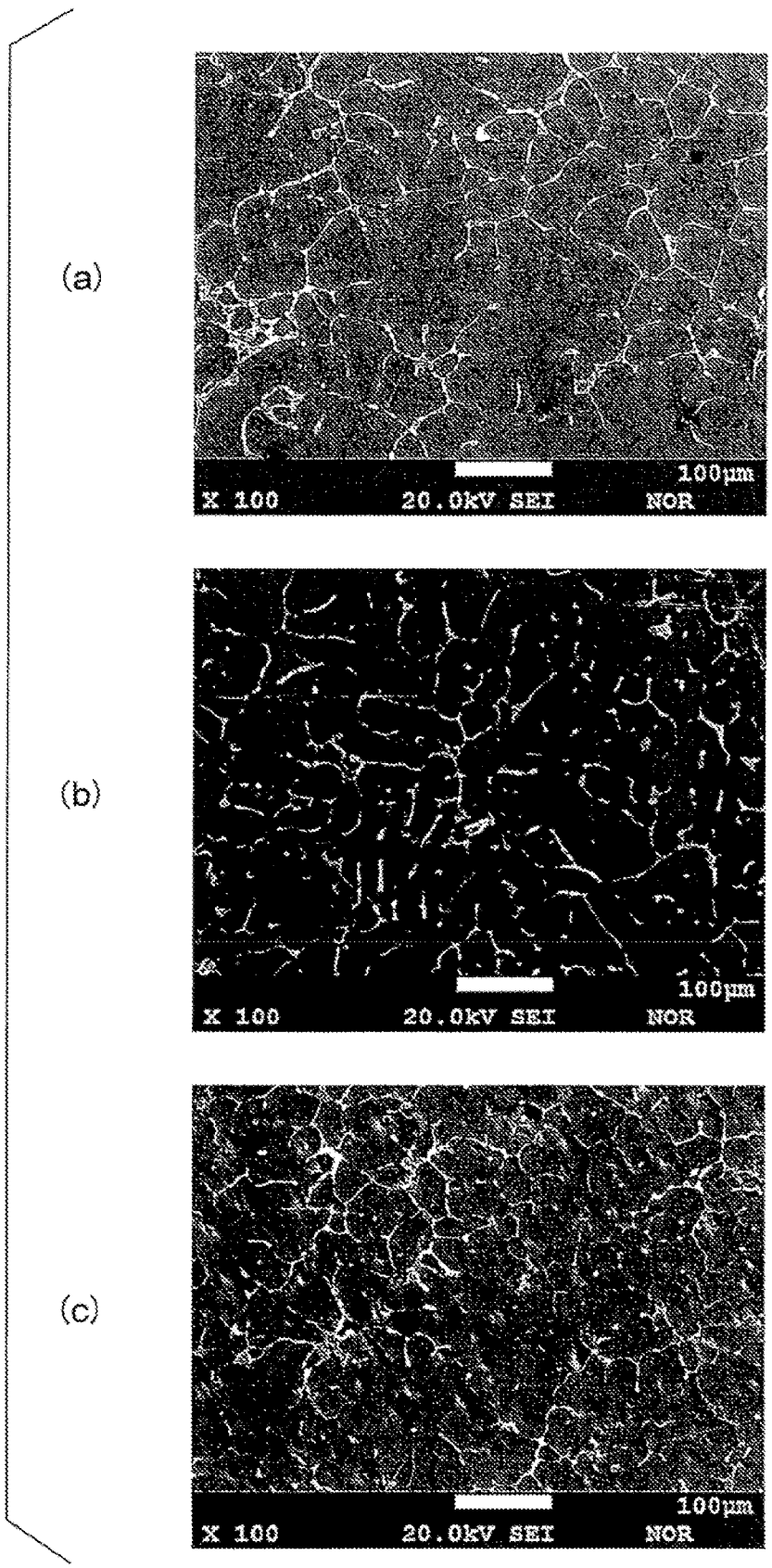
FIG. 2 is an electron microscopic photograph (secondary electron image) showing change of structure by adding C to an aluminum alloy having a composition corresponding to alloy number 2017 defined by JIS H4000 wherein (a) is for no addition of C, (b) is for addition of 0.1 wt % C, and (c) is for 0.3 wt % C.
Figure 3:
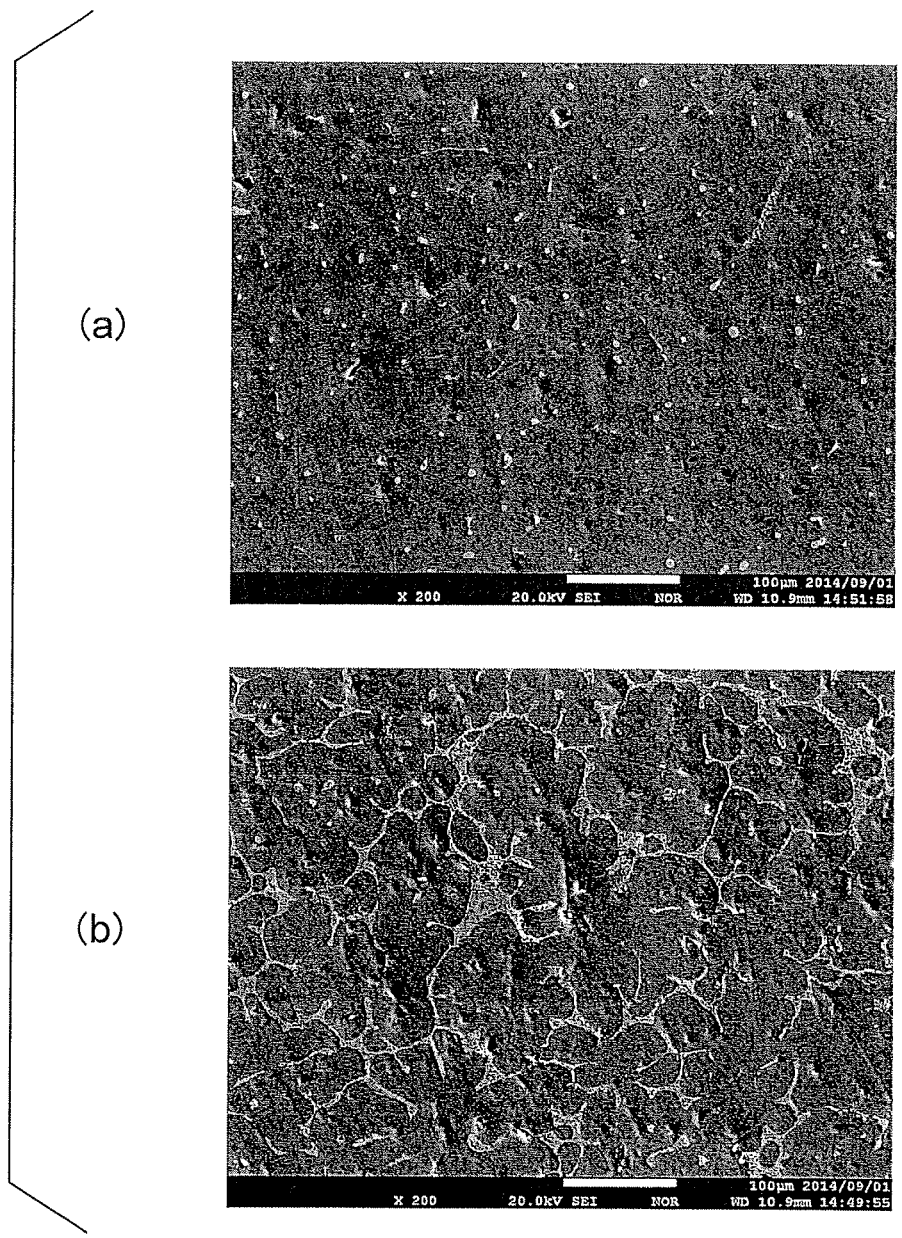
FIG. 3 is an electron microscopic photograph (secondary electron image) showing change of structure by adding C to an Al alloy containing 5 wt % Cu with the balance of Al and inevitable impurities wherein (a) is for no addition of C and (b) is for 0.3 wt % C.

Next, change of the structure caused by the addition of C is illustrated. FIG. 2 is an electron microscope picture (secondary electron image) showing change of structure when C is added to an aluminum alloy having a composition corresponding to alloy No. 2017 defined by JIS H4000 wherein (a) is for no addition of C, (b) is for addition of 0.1 wt % C, and (c) is for addition of 0.3 wt % C. FIG. 3 is an electron microscope picture (secondary electron image) showing change of structure when C is added to an Al alloy that is made of 5 wt % Cu and the balance of Al and inevitable impurities wherein (a) is for no addition of C and (b) is for the addition of 0.3 wt % C. The preparation of the samples was carried out in the same manner as the preparation of the alloys of Table 1 above. The structures of FIGS. 2 and 3 are as-cast ones (As Cast) and neither rolling nor thermal treatment was carried out. The length of a white bar below the respective pictures indicates 100 μm in the pictures.

In both of FIGS. 2 and 3, refinement of structure caused by the addition of C was recognized. With the Al-5 wt % Cu-0.3 wt % C alloy shown in FIG. 3(b), there could be obtained substantially the same microstructure as with the alloy corresponding to C-free 2017 alloy shown in FIG. 2(a). The present inventors consider that refinement of structure is a main factor of improving the alloy strength.

Figure 4:
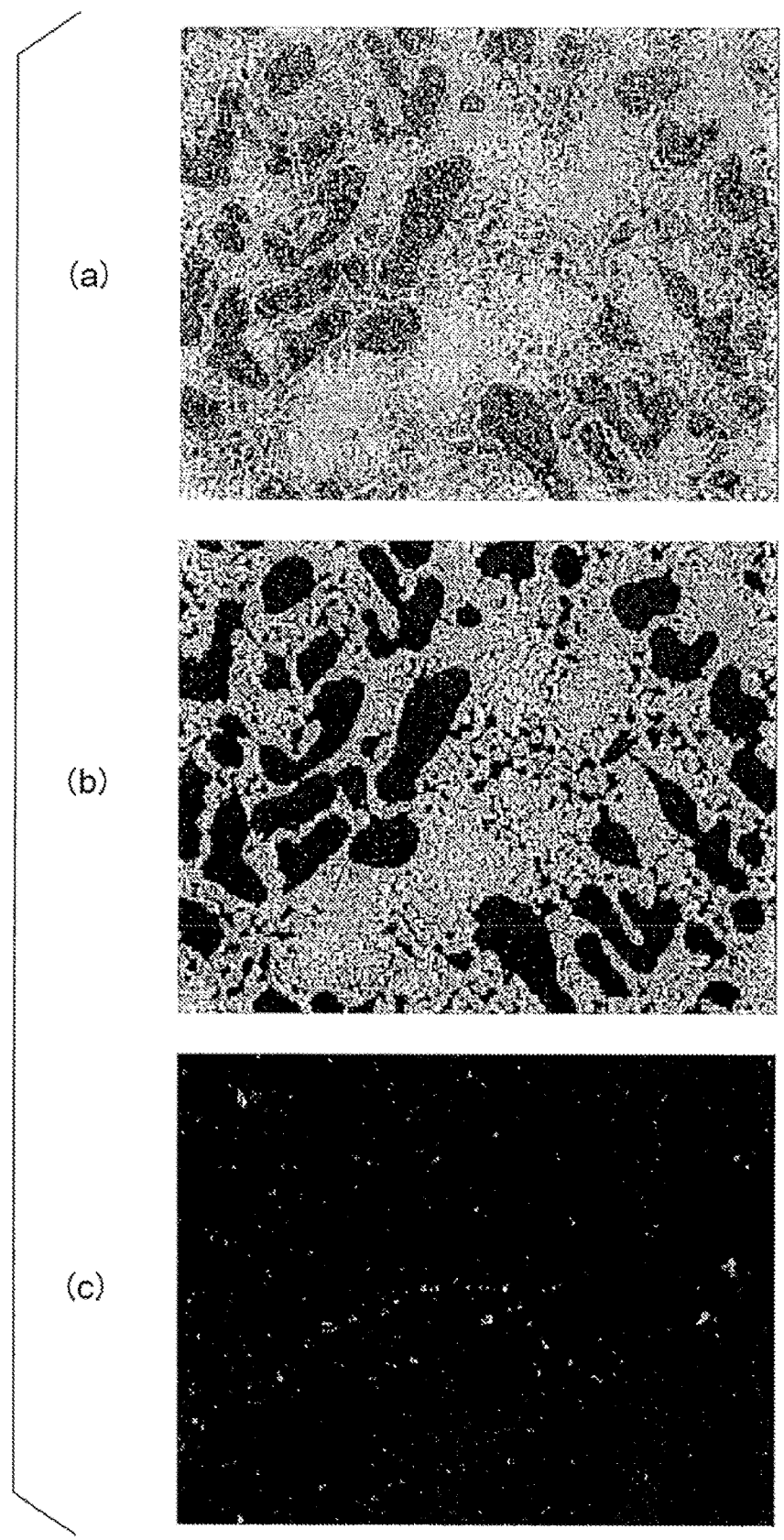
FIG. 4 is an X-ray map obtained by an electron probe microanalyzer (EPMA) wherein (a) is for Al, (b) is for Cu, and (c) is for C.

FIG. 4 is an X-ray map obtained by an electron probe microanlayser (EPMA) wherein (a) is for Al, (b) is for Cu, and (c) is for C. The X-ray map indicated herein is a monochrome copy of a colored original showing a maximum density region as red and a minimum density region as blue (provided that an intermediate density is conformed to the color sequence of the color circle). In the X-ray maps (a) and (b), large-sized, lumpy portions indicate primary crystals of Al. In the X-ray maps (a) and (b), aggregated small-sized, lumps indicate eutectic Al—Cu. C is abundantly contained at portions seen as white in (c).

Figure 5:
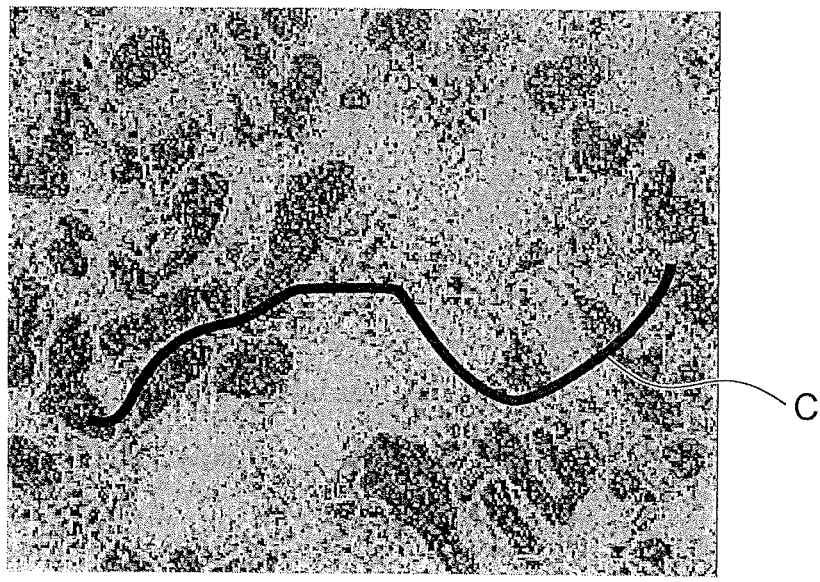
FIG. 5 is a view showing sites wherein C is abundantly detected on the X-ray map of FIG. 4(a).

FIG. 5 shows that sites wherein C is abundantly detected are superposed on the X-ray map (a) of FIG. 4. In view of this configuration, the present inventors have figured out that C is mainly distributed at the crystal grain boundary. The present inventors have assumed at present that C distributed at the crystal grain boundary brings about the refinement of crystal grains and contributes to improved mechanical properties. There may be some cases that participation of elements at the crystal grain boundary lowers alloy ductility although depending on the type of alloy. With the Al—Cu—C alloy, such a phenomenon of lowering the ductility is not recognized, but both strength and ductility are improved by the addition of C.

The mechanism how C is involved in reinforcement of the alloy has not been fully clarified at the present stage. However, it is an evident fact that when graphite particles and carburization promoter particles containing boron or a boron compound are added to a Cu-containing Al molten metal, an Al—Cu—C alloy whose structure is refined and which has enhanced structure is reproducibly, reliably obtained. Accordingly, the present invention should not be construed as unduly, narrowly limited on the basis of the theory as to how C takes part in the reinforcement of the alloy.

If the amount of C is considerably small, the effect of improving alloy strength has been recognized. At the present stage, when C is added, for example, at about 80 ppm (0.008 wt %), improved alloy strength has been recognized. At this time, when the amount of C is increased to about 0.4 wt %, improved alloy strength has been recognized without adverse influence on other characteristics. More particularly, it is assumed that the tolerance in amount of C in the alloy is fairly wide and the amount of C should be appropriately determined while taking desired alloy strength and material costs (for not adding C in amounts more than necessary) into account. That is, the present invention should not be construed as unduly, narrowly limited in terms of the content of C.

As a matter of course, the improvements in structure and strength by addition of C have been confirmed with respect to a casting alloy. This has been recognized by an experiment. The results of the experiment are briefly described.

An AC2A alloy (JIS H5202) ingot was melted, to which graphite particles and carburization promoter particles were added to the molten metal in the same manner as in the foregoing examples, followed by casting in a mold to prepare an ingot. Thereafter, the ingot was directly (without rolling and thermal treatment) into a test piece having the same shape as the test piece used in the examples. The ingot of the AC2A alloy used herein contained 3.67 wt % Cu and 5.3% Si with the balance of inevitable impurities. C was added at 0.04 wt %.

The results of the tensile test are as shown below, and it has been found that the addition of C results in improvement in tensile strength and elongation.

TABLE 2

|  | Tensile strength (N/mm²) | Elongation (%) |
| --- | --- | --- |
| AC2A (No. 1) | 150 | 2.5 |
| AC2A (No. 2) | 134 | 1.7 |
| AC2A + 0.04% C (No. 1) | 166 | 2.6 |
| AC2A + 0.04% C (No. 2) | 174 | 3.1 |

The invention claimed is:

1. A method for producing an Al alloy containing Cu and C, comprising:
   a step of preparing a molten Al containing Cu;
   a step of adding graphite particles and carburization promoter particles containing boron or a boron compound to a molten Al containing Cu at a temperature within a range from 800° C. to 1000° C. under a low oxygen atmosphere or a shielding gas atmosphere;
   a step of removing drossy carburization promoter which is originated from the carburization promoter particles and is floating on the surface of the molten Al containing Cu, after the graphite particles are dispersed in the molten Al containing Cu; and
   a step of casting the molten Al containing Cu into which graphite particles are dispersed into a mold.

2. The method of claim 1, wherein the molten Al containing Cu, to which the graphite particles and the carburization promoter particles are added, is a molten metal of a Al—Cu binary alloy containing Cu with the balance of Al and inevitable impurities.

3. The method of claim 2, wherein the Al—Cu binary alloy contains 27 to 36 wt % Cu.

4. The method of claim 1, further comprising a step of adding at least Al to the molten metal obtained after the adding of the graphite particles and the carburization promoter particles.

5. The method of claim 4, further comprising a step of adding an alloy element other than Cu to the molten metal after the adding of the graphite particles and the carburization promoter particles.

6. The method of claim 1, wherein the molten Al containing the Cu, to which the graphite particles and the carburization promoter have been added, is a molten metal of an alloy containing Cu and an at least one alloy element other than Cu and the balance of Al and inevitable impurities.

7. The method of claim 6, wherein the at least one alloy element other than Cu includes Si.

8. An Al alloy containing Cu and C, which is prepared according to the method defined in claim 1.

* * * * *